United States Patent [19]

Shields

[11] Patent Number: 4,502,516

[45] Date of Patent: Mar. 5, 1985

[54] VENTED FUEL TANK FILLER

[75] Inventor: William A. Shields, Riverside, Ill.

[73] Assignee: General Motors Corporation, Detroit, Mich.

[21] Appl. No.: 492,181

[22] Filed: May 6, 1983

[51] Int. Cl.³ .............................................. F16L 37/00
[52] U.S. Cl. ..................................... 141/290; 137/588
[58] Field of Search ............... 141/290, 293, 294, 302; 137/345, 588, 594, 322, 614.03; 251/149.6

[56] References Cited

U.S. PATENT DOCUMENTS

| 4,105,046 | 8/1978 | Sturgis | 251/149.6 X |
| 4,122,968 | 10/1978 | Germain | 220/86 R |
| 4,137,943 | 2/1979 | Rath | 137/587 |
| 4,142,470 | 3/1979 | Zauss | 105/26 R |
| 4,212,333 | 7/1980 | Randolph | 141/302 X |
| 4,269,219 | 5/1981 | Dybvig | 251/149.6 X |

OTHER PUBLICATIONS

Hansen Couplings (Catalogue #70-2, 2 pp.).
Emco Wheaton (Catalogue E-60, 2 pp.).

Primary Examiner—Stephen Marcus
Assistant Examiner—Mark Thronson
Attorney, Agent, or Firm—Robert J. Outland

[57] ABSTRACT

A fuel tank filler including a positive vapor return vent system that prevents substantial loss of vapor or liquid is provided using an arrangement of relatively light weight and low cost coupling members. A guide provided together with the arrangement of the couplings requires connection of the vent coupling before the fill pipe is connected and until it is disconnected so that fuel cannot be added unless the return vent is operative.

3 Claims, 5 Drawing Figures

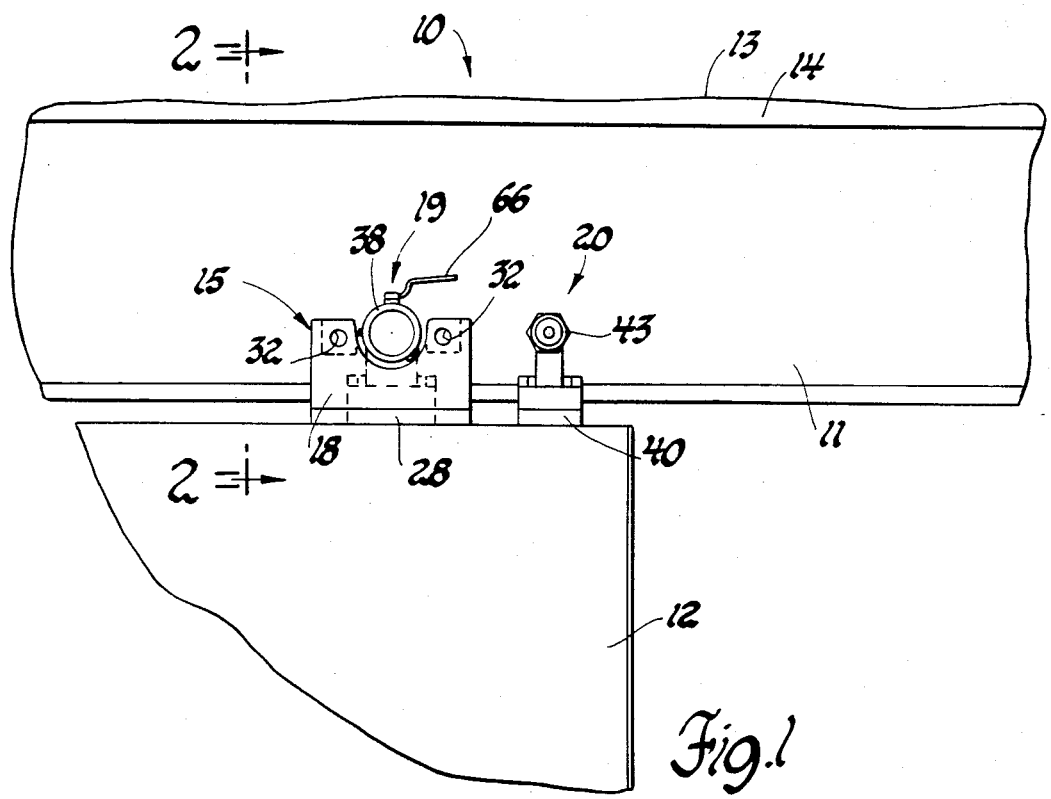
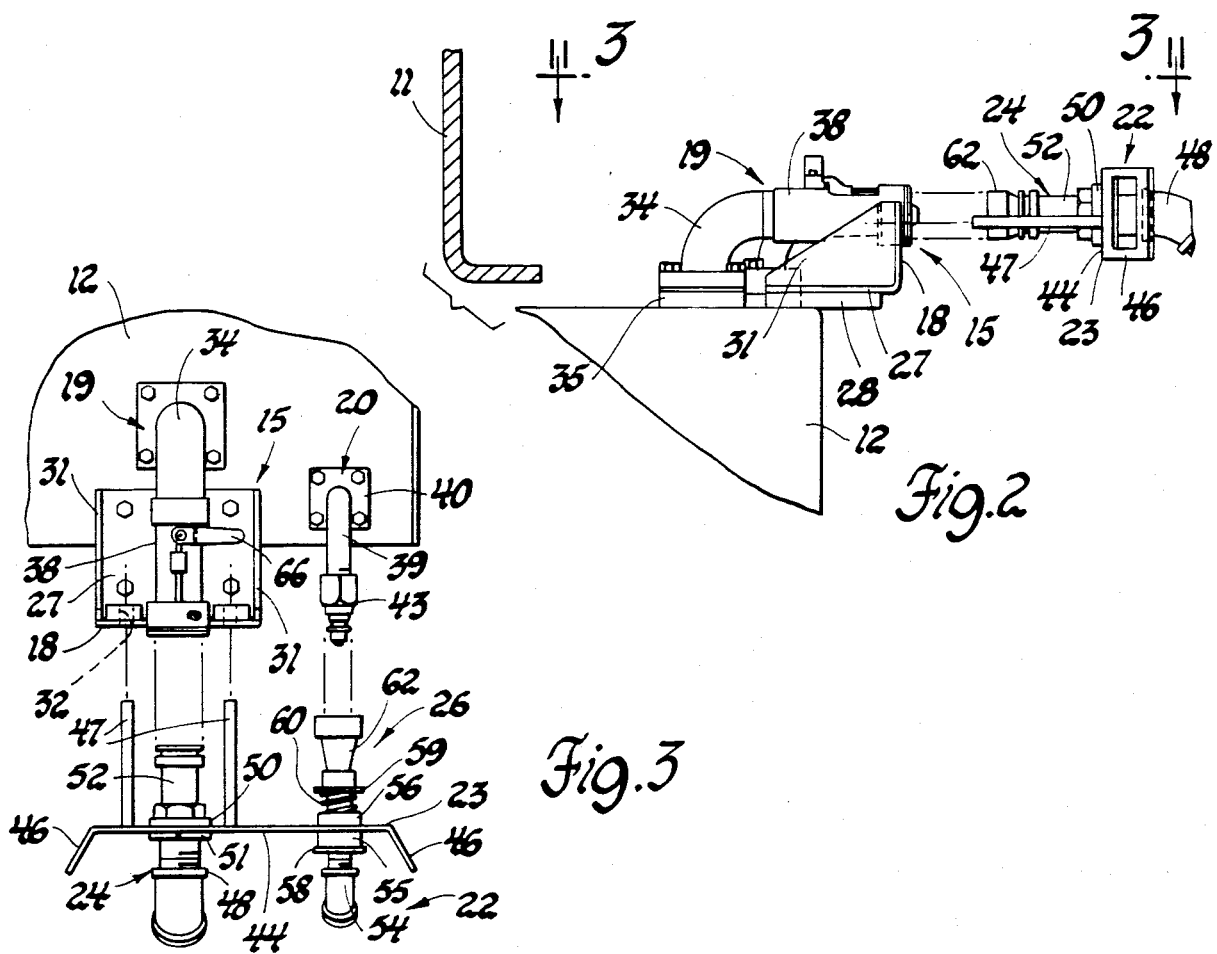

VENTED FUEL TANK FILLER

TECHNICAL FIELD

This invention relates to vented tank fillers for liquid fuels. In its more particular aspects the invention relates to positively vented non-spill tank fillers for liquid fuels and especially to fillers for relatively large volume tanks, such as those used on combustion engine powered railway locomotives.

BACKGROUND

Tank filler devices and systems are known which can transfer vaporizable liquids from a fuel storage facility to a tank and, in addition, return the vapor escaping from the tank being filled to the supply tank or other storage means from which the fuel supply is being delivered. Such systems have been proposed for use where it is desired to prevent the escape of fuel vapors to the atmosphere during tank filling operations. Some such systems have utilized coaxial conduits having sealing means connecting with the outer edge of the tank filler opening so as to retain vapor escaping therefrom and carry it into the supply facility through an outer passage while delivering liquid fuel into the filler opening through a coaxial inner passage-defining nozzle.

Diesel locomotives generally are provided with fuel tank filler systems involving a quick connecting coupling and a large diameter filler pipe, for example 2½ inch, through which diesel fuel is delivered to the locomotive fuel tank at rates of several hundred gallons per minute. Closed vent vapor return systems have not generally been used, since the volatility of diesel fuel is relatively low and the fuel, if spilled, is relatively difficult to ignite. However, consideration is being given to the possible use of alternative more volatile fuels, such as methanol, for combustion engines in locomotives as well as in other applications for which it may be desirable to provide a closed vent vapor return filler and to minimize the spillage of fuel and escape of vapors from the system during filling. Coaxial filler and vapor recovery systems are available for commercial delivery of gasoline to automotive service stations and the like and might be adopted for locomotive tank fillers. However they are relatively heavy and could be awkward to attach to a filler pipe located on the side of a locomotive. In addition, their cost is relatively high.

SUMMARY OF THE INVENTION

The present invention provides a vented fuel tank filler for locomotives and other applications which provides vapor recovery during filling using relatively simple commercially available individual coupling members for separate fill and vent lines to provide a low cost system. A feature of the invention is that the system is preferably arranged to require connection of the vent conduit prior to engagement and opening of the fill coupling. Also, shutting and disconnecting the fill coupling must precede closing and disconnecting the vent conduit. Another feature is that the fill and vent couplings may include sealing valves that prevent the escape of vapors or fluids through the coupling members prior to joining of the associated members of each coupling in sealing relationship, thereby preventing the loss of substantial vapor or liquid fuel from the system. Another feature is that guide means are provided to prevent joining of the fill coupling members without first connecting the vent coupling members so that unvented filling of the fuel tank is avoided.

These and other features and advantages of the invention will be more fully understood from the following description of a preferred embodiment taken together with the accompanying drawings.

BRIEF DRAWING DESCRIPTION

In the drawings:

FIG. 1 is a fragmentary side view of a railway locomotive showing portions of the underframe and fuel tank and associated portions of a fuel tank filler formed in accordance with the invention;

FIG. 2 is an end view from the plane of the line 2—2 of FIG. 1 showing the fuel tank filler members prior to their connection;

FIG. 3 is a plan view from the plane of the line 3—3 of FIG. 2 further illustrating the filler elements prior to connection;

DETAILED DESCRIPTION

Figure 4:
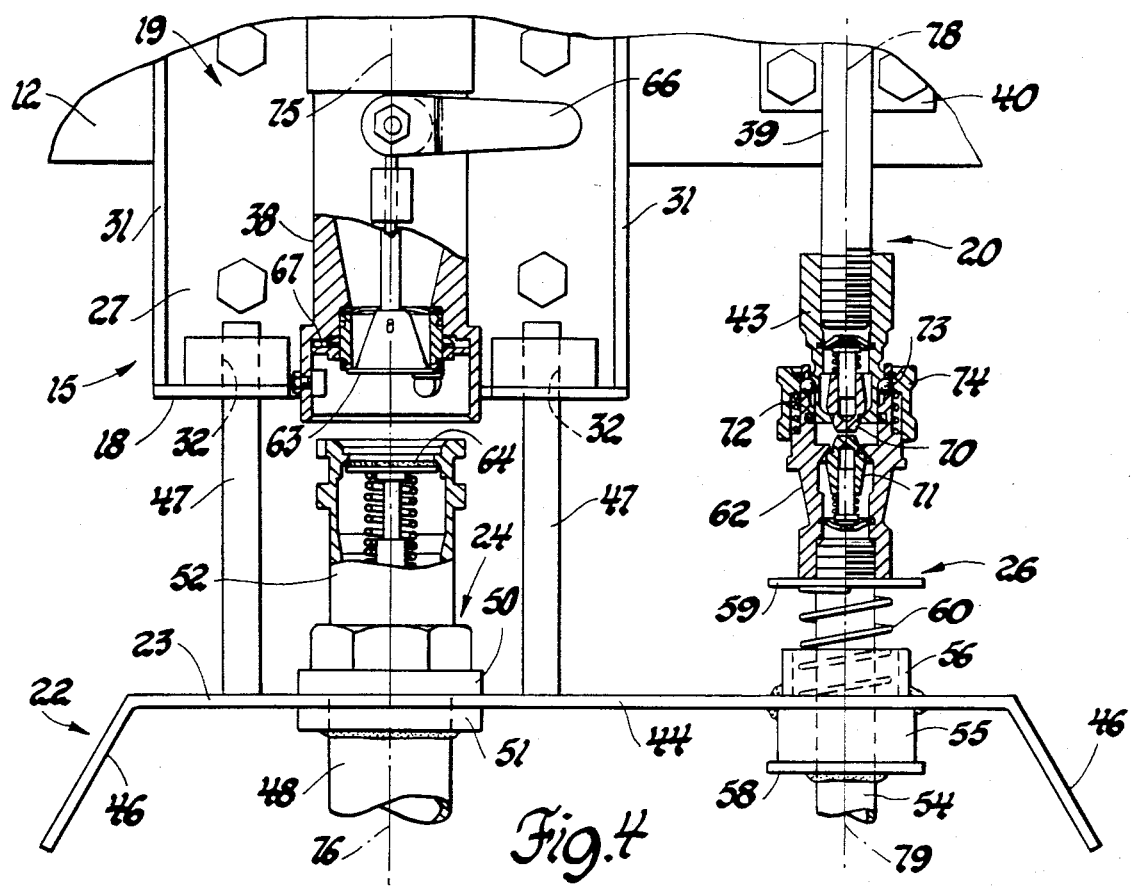
FIG. 4 is an enlarged plan view partially in cross section and showing elements of the tank filler in the process of being connected or disconnected.

Referring now to the drawings in detail, numeral 10 generally indicates a railway locomotive of the type powered by a combustion engine, such as a diesel engine or the like, capable of operating on diesel or other liquid fuels or mixtures thereof. Locomotive 10 includes a supporting underframe 11 conventionally carried on rail engaging trucks, not shown, and supporting thereunder a fuel tank 12. A locomotive carbody 13 carried by the underframe includes overhanging portions 14 extending above and outwardly of the outer sides of the fuel tank.

Mounted above the fuel tank, preferably on either side and in the space underneath the overhanging portions 14 of the carbody, are the fixed portions 15 of a fuel tank filler formed in accordance with the invention. Fixed portions 15 include a guide plate 18, a fill pipe and coupling assembly 19 and a vent pipe and coupling assembly 20. These fixed portions of the tank filler are engageable by an assembly of movable portions 22 including a guide and carrier member 23, a supply pipe and coupling assembly 24 and a vent return pipe and coupling assembly 26.

In the fixed portions 15 of the fuel filler, the guide plate 18 extends vertically underneath and around the bottom of the fill pipe and coupling assembly 19 near its outer end. The guide plate is supported on the top of the fuel tank by triangular supporting structure including a floor 27 mounted on spacers 28 and triangular end plates 31 connecting the floor with the upstanding guide plate 18. A pair of guide openings 32 extend through the guide plate, one opening on either side of the fill pipe and coupling assembly for purposes to be subsequently described.

The fill pipe and coupling assembly 19 includes an L-shaped fill pipe 34 extending upwardly from a boss 35, defining an opening in the upper wall of the fuel tank and outwardly over the top of the fuel tank. At its outer end the fill pipe 34 carries a fixed member 38 of a fill coupling to be subsequently described.

The vent pipe and coupling assembly 20 likewise includes an L-shaped vent pipe 39 extending upwardly from a boss 40, defining an opening in the upper wall of the fuel tank and outwardly over the top of the fuel tank, parallel with the fill pipe 34. At its outer end the vent pipe 39 is connected with a fixed member 43 of a vent coupling to be subsequently described.

In the movable portions 22 of the fuel filler, the guide and carrier member 23 includes a carrier plate 44 having a flat center portion adapted to be positioned vertically when in use. The plate 44 has at the lateral ends thereof suitably angled portions with openings to form handles 46 for manually supporting and moving the movable portions 22. The carrier plate 44 also includes laterally spaced openings, not shown, through which the supply pipe and coupling assembly 24 and the vent return pipe and coupling assembly 26 extend. Two parallel guide pins 47 are secured to and extend in operative position, inwardly from the carrier plate. These pins 47 are adapted to be received in the guide openings 32 located in the guide plate 18 as will subsequently be more fully discussed.

The supply pipe and coupling assembly 24 includes a supply pipe 48 extending through and secured in an associated one of the spaced openings of the carrier plate by a washer 50 and flange 51. The mounting means prevents substantial axial movement of the supply pipe assembly 48 in the plate opening but allows oscillating motion for a purpose to be subsequently described. Pipe 48 connects at its outer end with a supply hose, not shown, leading from a fuel supply tank or other source of fuel. At its inner end, supply pipe 48 connects with a movable member 52 of the two piece fill coupling 38, 52 to be subsequently described. The outer end of the fill coupling member 52 engages the washer 50 to hold it in position on the pipe 48.

The vent return pipe and coupling assembly 26 includes a vent return pipe 54 carried for limited longitudinal motion in a pair of sleeves 55, 56 fixed to the carrier plate 44 around the other of the spaced openings and through which the vent return pipe 54 extends. Stop washers 58, 59 are secured at spaced locations to the vent return pipe 54 and engage the sleeves 55, 56 respectively to limit the longitudinal motion of the vent return pipe 54 therein. A coil spring 60, extending between the carrier plate 44 and the washer 59, is received within sleeve 56 and biases the vent return pipe 54 in a direction outward from the carrier plate as will subsequently be more fully described. The pipe 54 connects at its outer end with a return vent hose, not shown, leading back to the fuel supply source. At its inner end the pipe 54 connects with a movable member 62 of the two piece vent coupling 43, 62 to be subsequently described.

Figure 5:
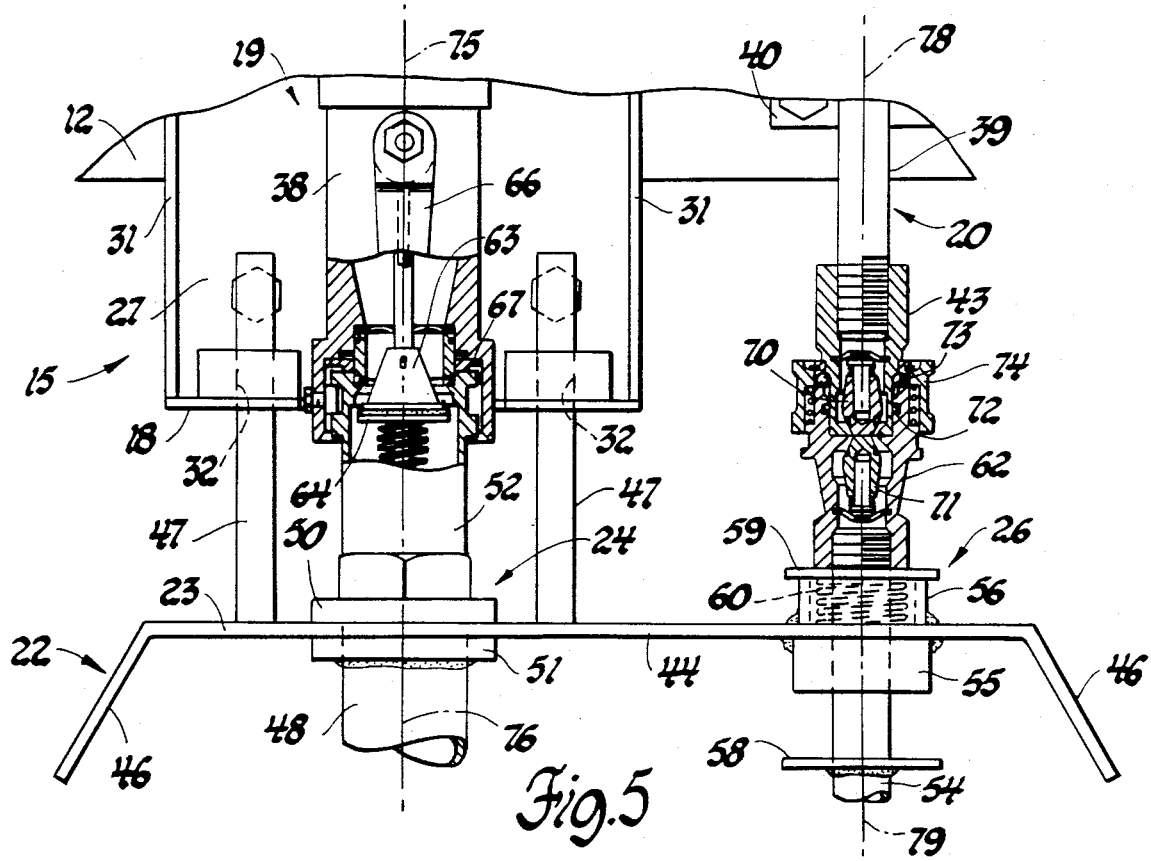
FIG. 5 is an enlarged plan view partially in cross section showing the fuel tank filler elements connected and open to the flow of fuel and vapors.

The fill coupling, made up of fixed and movable members 38, 52 respectively, is preferably of the interlocked dry break type having in the members valve elements 63, 64 respectively which are maintained closed at all times when the coupling members are disconnected. Opening of the valve elements by means of a handle 66 provided on the fixed coupling member is prevented by a mechanical interlock 67 until the coupling elements are connected and the mechanical interlock is rotated by a slight relative rotation of the coupled members so as to release the blocking interlock and permit the valve handle to be turned to a position opening both valves. Dry break couplings of the type described are commercially available. For example, a coupling similar to that illustrated, in part schematically, in FIGS. 4 and 5 is obtainable from the Buckeye Division of EMCO Wheaton, Conneaut, Ohio, in a variety of sizes intended for the nonspill transfer of fuels and other liquids.

The vent coupling made up of fixed and movable members 52 and 62 respectively is preferably of the two-way shut-off socket and plug type having valve elements 70, 71 spring biased to a closed position in each of the coupling members. A seal 72 in the movable socket member 62 engages the end of the fixed plug member 43 to seal the connection before the coupling members are moved into their fully engaged position in which the valve elements are opened by engagement with one another. A locking ring 74 on the end of the movable socket member 62 controls the movement of locking balls 73 which prevent the unitentional disengagement or engagement of the vent coupling. Two-way shut-off couplings of the type described are commercially available. For example, coupling members of the type illustrated, in part schematically, in FIGS. 4 and 5 are available from the Hansen Manufacturing Company of Cleveland, Ohio in various suitable sizes for use with various fluids.

It should be noted that both the dry break fill coupling and the two-way shut-off vent coupling have their respective fixed and movable members centered on coaxial connection axes 75, 76, 78, 79 respectively along which relative axial motion of the associated coupling members is required to couple or uncouple the respective couplings. The fixed members 38, 43 of the fill and vent couplings are mounted on their respective pipe assemblies with their connection axes parallel and displaced at a predetermined distance from one another. In like manner, the movable members 52, 62 of the fill and vent couplings are mounted on their respective pipe assemblies with their connection axes parallel and displaced from one another a distance equal to the distance between the axes of the fixed coupling members.

Obviously, to enable coupling of the fill and vent coupling members requires alignment of the connection axes of their respective fixed and movable members. This is aided by the guide pins 47 and their associated guide openings 32 which, when engaged, automatically place the axes of the fixed and movable coupling members in substantial alignment. It should be noted that the guide pins and their openings lie in a plane which is displaced somewhat below the connection axes of the associated fill coupling members so as to prevent connecting the fill coupling without connecting the vent coupling by inverting the movable carrier and guide assembly.

It should also be noted, as illustrated in FIG. 4, that the vent coupling is sealed by an initial coupling movement before opening of the internal vent valves 70, 71. These valves are opened only upon further relative axial movement of the coupling members toward their final locked positions shown in FIG. 5. The fill coupling, however, must be moved into its final locked position before the interlock 67 can be released and the fill valves opened. Thus the vent coupling must be sealed and the vent valves opened before the fill coupling can be fully engaged and the fill valves opened. In like manner, the fill valves must be closed and the fill coupling disengaged before the vent valves are closed and the vent coupling is completely disengaged.

In addition, the spring biased movement of the movable vent return pipe and coupling assembly 26 biases the movable vent coupling member 62 even further forward toward its mating fixed vent coupling member 43 so as to independently urge the vent coupling toward engagement prior to engagement and coupling of the fill coupling members 38, 52. This arrangement assists the operator in completing engagement of the vent coupling prior to final engagement of the fill coupling, which requires movement of the movable vent return pipe and coupling assembly against the biasing spring 60 to the limit permitted by its associated stop.

In operation, positively vented non-spill filling of a fuel tank without substantial loss of vapor or liquid is accomplished as follows. The movable assembly is manually lifted by the handles 46 and placed so that the guide pins 47 enter into the guide openings 32 in the guide plate 18 of the portion fixed to the associated fuel tank which is desired to be filled. The movable portions assembly 22 is then advanced with the coupling axes of the fixed and movable members of the fill and vent couplings respectively in alignment until initial sealing engagement of the vent coupling members 43, 62 occurs. Release of the locking ring 74 then permits full engagement of the vent coupling members and further advancement of the movable assembly 22, opening the vent valves 70, 71 and moving the fill coupling members 38, 52 into full engagement. At this point, a slight turn of the supply pipe with its attached movable fill coupling member 52 releases the interlock 67 in the fill coupling member 38 and allows turning of the valve handle 66 to open the fill valves 63, 64. Filling of the tank from the supply system connected to the movable fill coupling member can then be undertaken with the return fuel vapor being conducted through the connected vent pipe and vent return pipe and coupling assemblies into the supply system.

The vent pipe system is preferably made large enough to permit a return flow of the liquid fuel back through the vent system into the supply tank in case the automatic shut-off usually provided in the supply system fails to operate when the tank is full.

When the tank is full and the fuel supply is shut off, disconnection of the system is accomplished in the reverse manner in which it is connected. Thus, the fill coupling valves 63, 64 must first be closed by turning the valve handle 66 to the closed position of FIG. 4 before the coupling members 38, 52 can be relatively rotated to permit them to be disconnected. Thereafter, movement of the movable portions 22 of the tank filler away from the fixed portions 15 first disconnects the fill coupling 38, 52, with its valves already closed, and then allows the vent coupling 43, 62 to be disconnected upon release by movement of the locking ring 74. This action first causes the vent valves 70, 71 to close, after which the sealing connection of the vent coupling members 43, 62 is broken. Lastly, the guide pins 47 are removed from the guide openings 32 to fully separate the movable and fixed portions of the tank filler.

It should be recognized that the present invention provides a relatively inexpensive fuel tank filler arrangement providing non-spill connection and positive venting with vapor recovery, if desired, utilizing commercially available noncoaxial coupling members. The arrangement is such that the fill pipe cannot be connected without first connecting and opening the vent pipe and the vent pipe cannot be disconnected without first closing and disconnecting the fill pipe.

While the invention has been described by reference to a specific embodiment chosen for purposes of illustration, it should be understood that numerous changes could be made without departing from the spirit and scope of the inventive concepts described. Various types of coupling members, both valved and unvalved, could be substituted, if desired, and other types of guide means using one or more guide elements could be utilized within the scope of the invention. These and other changes which may be made are intended to be encompassed within the scope of the invention which is not limited to the disclosed embodiment but is intended to have the full scope permitted by the language of the following claims.

The embodiments of the invention in which an exclusive property or privilege is claimed are defined as follows.

1. A positively vented nonspill tank filler for liquid fuels, said filler including
   fill and vent couplings connectible with associated fuel storage and supply means, said couplings each having first and second members connectible with one another to define sealed connecting fluid passages, the members of each said coupling having coincident connection axes along with relative movement is required to connect and disconnect said members,
   said fill coupling having passage closing valve means in each of its members, said valve means being interlocked to prevent the opening thereof prior to advancing their respective members to a final position of sealing connection,
   said vent coupling having passage closing valve means in each of its members, said vent coupling valves being opened by inward telescoping movement of their coupling members after sealing connection thereof,
   fixed and movable mounting means carrying said coupling members,
   one of said fixed and movable means mounting said first members in laterally spaced relation with their connection axes parallel,
   the other of said fixed and movable means mounting said second members in laterally spaced relation with their connection axes parallel, the connection axes of said second members being spaced equally to those of said first members,
   guide means connected with said fixed and movable mounting means and effective to require alignment of the axes of the fill and vent coupling members respectively prior to connection of said members,
   said mounting means axially positioning the vent coupling members more closely on their respective axes when aligned than the fill coupling members, such that sealing connection of said fill coupling members and opening of the valves therein requires the prior sealing connection of said vent coupling members and further axial movement thereof to a valve opened position permitting fluid flow through the vent coupling passage, and that a reverse valve closing and detaching movement of the vent coupling members requires the prior closing of the fill coupling valves and detachment and axial withdrawal of the fill coupling members.

2. A fuel tank filler as defined in claim 1 wherein yieldable means acting between one of said mounting means and the vent coupling member supported thereby urges said supported vent coupling member axially toward a position providing early connection of the vent coupling members, said yieldable means allowing subsequent axial motion of the connected coupling members to permit subsequent connection of the fill coupling members.

3. A positively vented nonspill tank filler for liquid fuels, said filler including fill and vent couplings each having first and second members connectible with one another to define sealed connecting fluid passages, the members of each said coupling having coincident connection axes along which relative movement is required to connect and disconnect said members, said fill coupling having passage closing valve means in each of its members, said valve means being interlocked to prevent the opening thereof prior to advancing their respective members to a final position of sealing connection, said vent coupling having passage closing valve means in each of its members, said vent coupling valves being opened by inward telescoping movement of their coupling members after sealing connection thereof, fixed and movable connecting and mounting means associated with said coupling members, said fixed means connecting the first members of said fill and vent couplings respectively with fill and vent portions of an associated fuel tank and mounting said first members in laterally spaced relation with their connection axes parallel, said movable means connecting the second members of said fill and vent couplings respectively with fuel supply means and return vent means and mounting said second members in laterally spaced relation with their connection axes parallel, the connection axes of said second members being spaced equally to those of said first members, guide means connected with said fixed and movable mounting means and effective to require alignment of the axes of the fill and vent coupling members respectively prior to engagement of said members, said guide means including pin receiving means on said fixed mounting means and at least one guide pin extending from said movable mounting means and spaced laterally from said coupling members, said guide pin being receivable in said pin receiving means and of length sufficient to be so received prior to connection of said coupling members, said pin thus acting to guide and support said movable means in movement toward connection of said coupling members, said mounting means axially positioning the vent coupling members more closely on their respective axes when aligned than the fill coupling members, such that sealing connection of said fill coupling members and opening of the valves therein requires the prior sealing connection of said vent coupling members and further axial movement thereof to a valve opened position permitting fluid flow through the vent coupling passage, and that a reverse valve closing and detaching movement of the vent coupling members requires the prior closing of the fill coupling valves and detachment and axial withdrawal of the fill coupling members.

* * * * *